April 16, 1957 M. SCHNEIDER 2,788,953
AUTOMATIC PROPORTIONAL METERING, MIXING AND DISPENSING SYSTEM
Filed Feb. 11, 1954 5 Sheets-Sheet 1

INVENTOR.
MARVIN SCHNEIDER
BY
*James and Franklin*
ATTORNEY

April 16, 1957 M. SCHNEIDER 2,788,953
AUTOMATIC PROPORTIONAL METERING, MIXING AND DISPENSING SYSTEM
Filed Feb. 11, 1954 5 Sheets-Sheet 4

INVENTOR.
MARVIN SCHNEIDER
BY
*James and Franklin*
ATTORNEY

April 16, 1957  M. SCHNEIDER  2,788,953
AUTOMATIC PROPORTIONAL METERING, MIXING AND DISPENSING SYSTEM
Filed Feb. 11, 1954  5 Sheets-Sheet 5
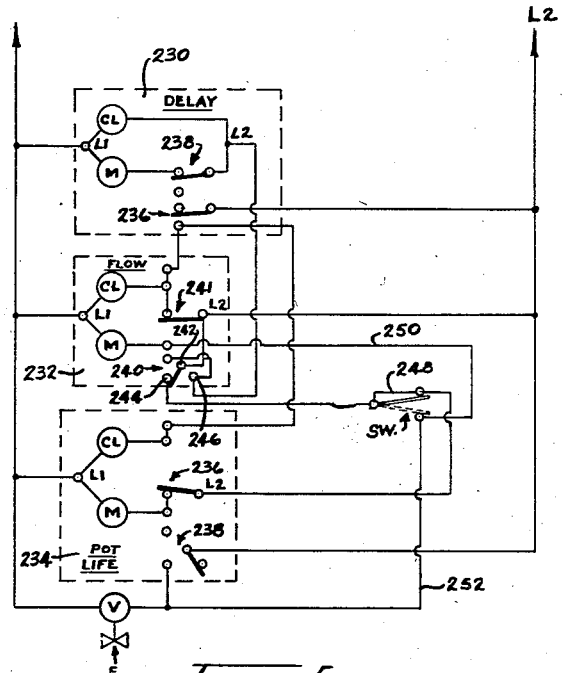
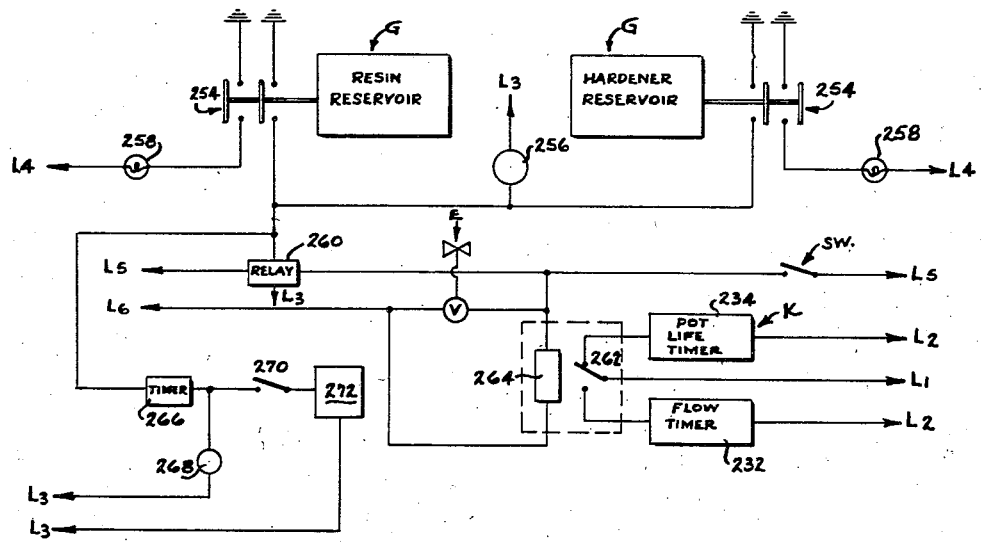
INVENTOR.
MARVIN SCHNEIDER
BY
ATTORNEY

United States Patent Office 2,788,953
Patented Apr. 16, 1957

2,788,953

AUTOMATIC PROPORTIONAL METERING, MIXING, AND DISPENSING SYSTEM

Marvin Schneider, Forest Hills, N. Y., assignor to Cayton, Inc., New York, N. Y.

Application February 11, 1954, Serial No. 409,669

30 Claims. (Cl. 259—4)

The present invention relates to a system for the continuous feeding of substances in carefully measured and proportioned quantities, the mixing of those substances, and the dispensing of the mixed substances. It has particular reference to a system in which a thermosetting resin and a hardener for that resin, in predetermined proportions, are adapted to be mixed and dispensed in a continuous manner.

Various combinations of resin and hardener are employed in numerous applications, and particularly for the sealing, embedment or encapsulation of other units, such as electrical components or sub-assemblies. It has been found that in order to obtain the best physical, chemical and, where applicable, electrical characteristics in the resinous material after curing or setting, and in order to subject the sealed units to the least possibility of damage or deterioration during the sealing operation, it is most desirable to use sealing materials which cure at a relatively low temperature. However, materials having such a curing temperature have the drawback that, if allowed to stand for any appreciable time, a partial or complete setting will take place even at room temperature, thus not only rendering the material thereafter incapable of use but also clogging or fouling the equipment in which they may be contained in an almost irremediable manner.

The sealing materials usually comprise a synthetic resinous substance and hardening substance therefor, both of these initial substances having a substantially indefinite life at room temperature and even at elevated temperature. However, when the two substances are mixed the hardener acts as a curing catalyst, and the mixture may have a "pot life," at room temperature, of only a few minutes. It is therefore necessary that once the material has been mixed the total amount of mixed material be used, actually applied to the units to be sealed, embedded or encapsulated, within that "pot life" time. Of course, after the mixed material has been applied to the units to be sealed, the curing or setting of the material is desired, and may even be accelerated by the application of heat thereto. The use of materials curing at a low temperature and having a short "pot life" has therefore been thought to require batch mixing operations in order to minimize waste.

Since only a small amount of the mixed materials can be dispensed and applied to the units to be sealed during the short "pot life" of the material, only small batches can be mixed at a time, and a second batch cannot be mixed until all of the first batch has been used up. This raises many serious production problems apart from the obvious cumbersomeness of the operation. Batch mixing is not accurately controllable either as to the time within which the mixing takes place or the exact proportions of material mixed. These variations make for consequent variations in the properties of the mixed material. The more hardener in relation to resin, the shorter will be the "pot life" and, usually, the lower will be the temperature of cure. Extreme variations in viscosity of the material may also result, leading to difficulties in the handling of the material during the operations subsequent to mixing. These problems have proved so troublesome from a production point of view that the industry has been forced to sacrifice the desired end characteristics of the cured material by utilizing an initial mix with longer "pot life" and with higher curing temperatures than are optimum, and even then without eliminating the cumbersome batch mixing operation.

According to the present invention a system has been devised by means of which mixed materials having optimum "pot life" and cure temperature characteristics may be employed, in which the resin and the hardener which make up that mixed material are always in substantially exact proportions, thus making for uniformity of the mixed material, and in which the feeding, measuring, mixing and dispensing are carried out in a continuous manner, automatically, and through the use of comparatively simple equipment. The design of the system is such that it may be used to mix and dispense substances of widely different physical and chemical characteristics, whether of the resin-hardener type or some other type. When mixed materials of short "pot life" are involved, the system is so designed that it may be shut down at the end of the working day with a minimum of trouble and with the wastage of only an insignificant amount of material, and may be readied for operation on the following day in an equal facile and time saving manner. In addition, automatic control means are provided so that, if the mixed material of limited "pot life" is not dispensed at such a rate as to prevent the mixed material within the system from setting, the system will automatically purge itself to the extent required, thus ensuring that the system will not be clogged or fouled by the material which it is to dispense.

A significant feature of operation of this system is that a pressure feed arrangement is provided to cause the substances to pass through the system from the unit in which they are deaerated to the reservoir in which they are stored and then through the metering devices and the mixer to the dispensing outlet, thus greatly reducing the cost of the installation and minimizing the possibilities of breakdown. Indeed, the specially designed metering mechanism, which for each substance preferably takes the form of an interconnected pair of bellows pumps, is itself powered by the pressure fed substances, the operation of the individual metering mechanism for each substance being interlocked so as to ensure accurately controlled proportioning of the amounts of those substances mixed with one another irrespective of any differences in their viscosity or other characteristics.

The rate at which mixed material may be dispensed from the mixing device is less than the rate at which measured quantities of the individual substances may be fed to the mixing device, thus ensuring that the mixing device will always be filled and therefore permitting close control of the characteristics and the uncured state of the mixed materials in the mixer and as they are dispensed therefrom. The mixer is of a special type which continuously recirculates the mixed material therethrough. This feature, plus the fact that as soon as mixed material is withdrawn from the mixer additional quantities of the individual substances are fed into the mixer, ensures that the "pot life" of the mixed material within the mixer is extended even though only a small proportion of the total mixer contents have been dispensed, provided that the replenishment takes place at a known rate. Since the rate of replenishment of the mixer is determined by the rate of withdrawal of mixed material therefrom, a measurement of the latter quantity, and a comparison of that quantity with elapsed time, indicates whether the mixed material in the mixer is approaching the end of its effective "pot life" or not. An arrangement of timers is provided to sense the condition of the mixed material in the mixer in terms of the replenishment rate to the mixer, these timers controlling an automatic purging or dispensing arrangement so that whenever the danger point is reached material will be withdrawn from the mixer to an extent sufficient to renew its "pot life." Of course, if useful dispensing takes place at a rate sufficient to provide the necessary mixer replenishment, this will be sensed by the timer controls and no purging will be necessary.

The above summary relates to some of the numerous advantages and objectives of the system of the present invention. Other advantages and objects of the invention will become apparent in the detailed description of the present invention which follows, that invention relating to a system for the metering, proportioning, mixing and dispensing of material, as defined in the appended claims and as described in this specification, taken together with the accompanying drawings in which:

Fig. 5 is a schematic diagram showing the operation of the dispensing rate sensing arrangement which controls the automatic purging of the mixer whenever the contents thereof are not replenished at the proper rate; and Fig. 6 is a schematic diagram showing a connection between the reservoir level sensing instrumentalities and the automatic purging system.

The system as a whole

Figure 1:
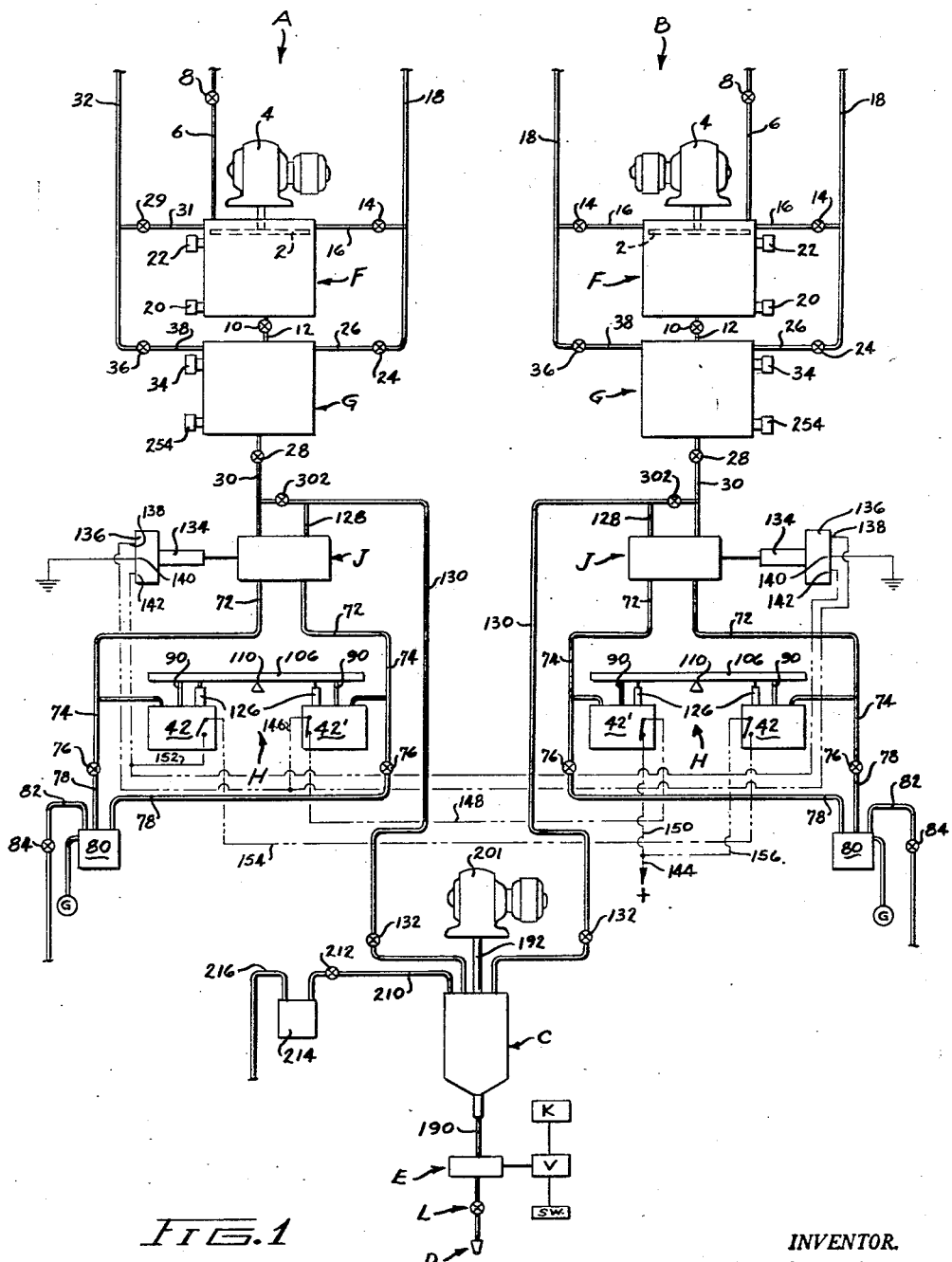
Fig. 1 is a schematic view of one embodiment of the present invention.

The system of the present invention will be here described as specifically employed for feeding and mixing closely proportioned quantities of resin and hardener. Each of the resin and hardener individually have a substantially indefinite "pot life," that is to say, they may be permitted to stand for extremely long periods of time without any appreciable change in their physical or chemical characteristics. However, when the resin and hardener are mixed the curing temperature of the mixture is greatly lowered when compared to that of the individual substances, and the mixture, if permitted to stand for, say, thirty minutes at room temperature, would cure or set to a hard condition, and it would be practically impossible to reverse the curing reaction. The disastrous consequences of permitting the mixed material to set while within a piece of handling equipment will therefore be obvious. It is possible that the equipment might be permanently ruined, and at best it would require a major overhaul to put it back into operating condition. It therefore is necessary, if a continuous system is to be provided—and such is one of the prime objectives of the present invention—that the mixing of the individual substances be delayed for as long as possible, and that after the substances are mixed the character of the mixed material will be continuously and automatically monitored in order to prevent the setting of that material while within the system.

It is also extremely important, if uniformity of the physical and chemical characteristics of the mixed material is to be attained, that the proportions of resin and hardener be accurately controlled and held constant through the operation of the system. Quite often, indeed, usually, the use of conventional measuring equipment is not possible because of the difference in viscosity of the two substances. Even when delicate adjustments are made to such conventional equipment to take the different viscosities into account, slight changes in temperature will affect those viscosities in different ways, and thus will render ineffective such fine adjustments. The present system avoids these disadvantages, and produces a uniform composition of the mixed material, by utilizing constant volume measuring devices which are individually powered and which are interlocked, through the use of valves and appropriate controls, so that when one of those units has permitted a predetermined quantity of its substance to reach the mixer it will not permit any more of its substance to feed until the other measuring device has correspondingly acted. The volume of the mixing chamber is considerably greater than the volume of the shots of individual substances fed thereto on each cycle of operation of the measuring devices, and consequently the proportions of resin and hardener in the mixer are maintained substantially uniform.

In order to accomplish these results, the overall system of the present invention comprises two separate feed systems generally designated A and B, one for resin and the other for hardener, these systems leading to a common receptacle C where the individual substances are thoroughly mixed. From there the mixed materials are dispensed through a nozzle D, a valve E controlling the dispensing. If desired, the valve E may also constitute a measuring device employed to control the volume of individual shots of dispensed mixed material or otherwise establish a known rate of flow of the material while it is being dispensed. Various types of such measuring devices are known, and they will not be here described in detail.

Since, as will become apparent hereinafter, the system is always filled and pressure is relied upon to feed the individual substances through the individual feed systems A and B and into and through the mixing chamber C to the dispensing nozzle D, it is necessary that the individual substances and the mixed material be substantially incompressible. This means that they must be free of entrapped gases, water and volatiles. Therefore each individual feed system A and B starts with a deaeration chamber F through which the individual substances must pass before they enter the individual reservoirs G. Once an adequate supply of deaerated resin and hardener have been accumulated within their respective reservoirs G, those reservoirs are sealed and pressure is applied therein, that pressure tending to force the individual substances out of their reservoirs G to the metering devices H, one set for each individual substance, each set being here disclosed in the form of bellows-type pumps controlled by a valve J, the metering devices H and valves J together controlling the quantities of their corresponding substances which are fed to the mixing chamber C. As will become apparent in the detailed description of the metering devices H to follow, no separate means for powering these devices need be provided, the force of the individual substances urged along their respective paths by the pressure in the reservoir G providing the power for operating them and also for feeding the individual substances from them into and through the mixer or common receptacle C. In the mixer C the substances are continuously mixed and circulated so long as no materials are dispensed therefrom, the system then being static except for the circulation of the mixed material in the mixer C. Neither of the individual substances can flow from their respective metering devices H into the mixer C because the latter is full and the individual substances are substantially incompressible. This will be the case even if both of the measuring devices H have completed a cycle of measuring and are fully conditioned by their valves J to carry out another cycle of measuring.

As soon as the valve E is opened material will be dispensed from the mixer C, additional quantities of the individual substances being fed into the mixer C in order to keep it full, all by reason of the pressure applied to the individual substances in their respective reservoirs G. The only power required for the system apart from the pressure applied to the contents of the reservoirs G is that required to operate the mixer C and, when deaeration is taking place, which is not a continuous operation, that required to operate the deaerators F. When a measuring device is employed to control the volume of the individual shots of mixed material dispensed through the nozzle D, or if, for some reason, positively acting dispensing means are desired, a small amount of power may be employed therefor, but this is not essential to the invention.

The significance of the interlock between the individual metering devices H, by means of which each is permitted but a single cycle of operation for a corresponding cycle of operation of the other, and the reason why this makes the metering arrangement independent of the individual viscosities of the substances, may be explained as follows. Assume that twice as much resin as hardener is desired in the mixed material. The metering device H in the individual feed system A for the resin is therefore set to dispense twice as much resin for each cycle of operation as the metering device H in the individual feed system B for the hardener will dispense hardener. Both metering devices H are of the constant volume type. Let us further assume that the hardener is much less viscous than the resin. The flow of hardener through the individual feed system B will therefore tend to be more rapid than the flow of resin through the individual feed system A. No feed at all will take place so long as the mixer C is full. When material is dispensed from the mixer C, each of the measuring devices H will start to feed their respective substances to the mixer C to keep the latter full. Both because less of the hardener is required and because the hardener flows more readily through its feed system B, the metering device H for the hardener will have fed its predetermined quantity of hardener to the mixer C, thus completing its cycle, before the metering device H for the resin has fed its desired quantity of resin to the mixer C. This will give rise to a slight increase in the proportion of hardener in the mixed material, but because of the great excess of volume of the mixer C when compared to the individual shots of resin and hardener fed into it on each cycle of operation of the metering devices H, the result will be negligible. Thereafter, as additional mixed material is dispensed from the mixer C, the metering device H for the hardener will not function, but the metering device H for the resin will continue its operation until it has completed its cycle. The interlock will then, and only then, condition both metering devices H to resume their cycles of operation. It follows that the departure of the proportions of the individual substances in the mixed material from the desired value will always be negligible, no matter what the relative proportions or viscosities of the two substances may be.

Once the resin and hardener have been mixed, that mixture will have a definite and short "pot life," and it has generally been considered that all of that material must be dispensed from its container within that "pot life" time unless serious consequences are to be risked. It has been found, however, that because of the continuous nature of the present system, with the contents of the mixer C being replenished with fresh resin and hardener as and to the extent that the mixed contents thereof are dispensed, all of the mixed material need not be dispensed, particularly in view of the constant circulation which takes place within the mixer C. Only a small proportion of the volume of the mixer C must be dispensed in order to completely renew the "pot life" of the entire contents thereof. Where the rate of dispensing of the material is known the amount of mixed material dispensed may be determined by measuring the time during which dispensing takes place. Total elapsed time may, of course, also be measured by a timer. Therefore, in order to protect the mixer C against the possibility of the contents thereof setting therein, an automatic control arrangement K is employed (see Fig. 5). This arrangement measures elapsed time and dispensing time. If, for example, the mixed material in the mixer C has a "pot life" of thirty minutes, and if a certain amount thereof corresponding to a dispensing time of ten minutes will provide the necessary replenishment of the contents of the mixer C so as to restore its "pot life," then whenever the dispensing timer measures ten minutes of dispensing, the elapsed time timer and the dispensing timer will be reset. However, if the elapsed time timer measures thirty minutes before the dispensing timer measures ten minutes, then dispensing will be automatically initiated and will be continuous until the dispensing timer measures ten minutes, at which time the contents of the mixer C will have been properly replenished and both timers will be reset as before. In order to prevent this automatic purging from creating a messy situation externally of the system or from ruining the units being operated upon, a manually controlled valve L may be provided in the dispensing line, that valve being normally open but being under the control of the operator who, apprised by an appropriate alarm of the imminence of the automatic purging operation, may close the valve L until he can convey the dispensing nozzle D to a suitable receptacle for receiving the purged material.

Since the operation of the system as described in an accurate manner is dependent upon the complete filling of the system by substantially incompressible substances, with no entrapped air or voids, each reservoir G is provided with a device for sensing the level of the substance therein. Whenever that level reaches a predetermined minimum such that the continued operation of the system involves the risk of air entering the feed lines, an alarm is sounded and at the same time the automtaic purging arrangement K is energized so as to complete the necessary replenishment of the contents of the mixer C to give those contents a thirty minute "pot life." This is done in order to ensure adequate time for the refilling of the reservoir G without endangering the mixer C. If there is sufficient deaerated substance in the appropriate deaerator chamber F, that substance can easily be transferred to its reservoir G within that period of time. If that cannot be done, steps will be taken, either automatically or manually, to purge the mixer C without adding hardener thereto, as described more in detail below under the heading "Operational Procedure."

*Deaerating and reservoir equipment*

There are many reasons why it is most desirable that the resin and hardener be substantially freed of entrapped gases, water and volatiles. In the first place, unless that is done these entrapped substances may adversely affect the required end characteristics of the unit sealed or encapsulated by the mixed material, and a lack of uniformity in the density of the mixed material will result, thus giving rise to a variation in the various significant characteristics of the mixed material itself after it has set.

In addition, deaeration of the working substance is necessary if accurate metering is to be achieved prior to mixing and if accurate measuring is to be achieved in dispensing. The main factor offsetting the ability to meter measured quantities of viscous resins and hardeners has been the compressibility of those substances due to gaseous products trapped therewithin, either air enveloped in the resin during its handling or the presence of volatiles in the resin which, upon subsequent heating thereof, are transformed into the gaseous state and subsequently trapped therein. It is usually the case that the amount of volatiles and air in any unit volume of resin or hardener will not be uniform from one unit volume to another.

It is for this reason that the deaeration chamber F is provided in advance of the reservoir G. The resin or hardener is introduced into the deaeration chamber F and there subjected to a treatment which will substantially completely rid it of entrapped air and which will also cause the volatiles to gasify and escape from the substance. The particular nature of the deaeration apparatus forms no part of the present invention, and will not be here illustrated or described in any detail. It may be stated, however, that it is the inventor's experience that deaeration attempted upon any substanial volume of resin is highly inefficient and time consuming because the entrapped gases beneath the surface of the substance must expand and force their way through the height of the mass of substance being treated. It therefore is preferred that the deaeration treatment be applied to a flowing thin film of resin and that, as is conventional, a vacuum be applied to the exposed surfaces of that film in order to increase the rate of escape of the trapped gases.

To this end, the type of deaeration chamber F which is preferred in the present system utilizes a rotary heated plate 2 within the deaeration chamber rotatively operatively connected to a motor 4 exteriorly mounted thereon, the resin or hardener being permitted to flow into the deaeration chamber F through line 6 by the opening of valve 8 therein and over the rotated plate 2 in a thin film at a rate such as to be completely or substantially completely deaerated, the deaerated substance then collecting in the bottom of the deaeration chamber F, escape therefrom being prevented by the closed valve 10 in the line 12 leading from the deaeration chamber F to the reservoir G. During the deaeration treatment valve 14 is opened, connecting the interior of the chamber F with a source of vacuum through the lines 16 and 18. The deaeration chamber F is preferably jacketed in conventional manner so that the contents thereof may be retained at a predetermined elevated temperature. While the valve 10 is closed the chamber F is isolated from the remainder of the system, and the deaeration treatment may be carried out at any time, independently of the status of the remainder of the system. Devices for automatically sensing the level of the deaerated substance in the chamber F are designated by the numerals 20 and 22, the former being actuated when the level falls below a predetermined minimum and the latter being actuated when the level rises above a predetermined maximum.

Once the deaerated substance has reached the predetermined maximum level, as sensed by the device 22, the deaeration treatment is stopped by closing the valve 8, thus shutting off the supply of non-deaerated substance, and by stopping the motor 4, thus terminating rotation of the plate 2. The valve 14 may be left open if desired, thus continuing the application of suction to the interior of the chamber F, or the valve 14 may be closed once the desired degree of vacuum has been attained in the chamber F. The supply of deaerated substance can then be permitted to stand for a long period of time, ready for transfer to the reservoir G when desired.

That transfer is accomplished as follows. First the valve 24 in line 26 is opened, thus connecting the interior of the reservoir G to the vacuum source via the line 18 and evacuating the interior of the reservoir G, the valve 28 in the line 30 leading from the reservoir G being closed. This evacuation is necessary in order that the transfer of deaerated material to the reservoir G should not be accompanied by any aeration of that substance. Then valve 29 in line 31 is opened, connecting the interior of the deaeration chamber F with a source of air pressure through line 32, and at the same time the valve 10 in the line 12 is opened. The air pressure is applied to the upper surface of the deaerated substance in the chamber F and thus forces that substance into the evacuated reservoir G. This is permitted to continue until the level of material in the chamber F reaches its predetermined minimum value, as sensed by the device 20, or until the level of substance in the reservoir G reaches a predetermined maximum, as sensed by the device 34 in the reservoir G, at which time the valve 10 is closed. A supply of deaerated substance is then in the reservoir G, ready for use.

The various operations thus far described may be carried out under manual control, but in order to prevent mishandling of the substances, a series of electrically controlled interlocks may be provided which will, for example, prevent the opening of valves 8 or 10 before the desired degree of evacuation of the chamber F or reservoir G has been achieved or, in the case of the opening of valve 10, if the substance in the chamber F is not at the proper temperature. The valves 8 and 10 may be automatically closed when the devices 22 or 34 sense that the maximum level in the chamber F or reservoir G has been attained. The system may be conditioned for completely automatic operation once it has been manually set in motion, as is preferred, or the interlocks may merely prevent improper manual actuation of the various valves. The specific means by which these controls may be carried out may be widely varied, involve the use of appropriate equipment well known in the industry, and consequently will not be here described in detail.

When the feed system is to be actuated, the valve 24 is closed, the valve 36 in line 38 is opened, and the valve 28 is opened, thus connecting the interior of the reservoir G with the source of air pressure via line 32, this air pressure, exerted on the upper surface of the substance in the reservoir G, tending to force that substance through the line 30 and all the way through the feed system to the dispensing nozzle D. This force constitutes the sole means for feeding the substance through its individual feed system A or B and for feeding the mixed material through the mixer C to the dispensing nozzle D, all as will become apparent hereinafter.

The reservoir G, as is conventional in handling substances of this type, may be jacketed so as to permit the contents thereof to be retained at a predetermined elevated temperature.

The metering system

The metering devices H which control the amounts of resin and hardener fed to the mixer C, the controlling valves J used in conjunction therewith, and the interlocks between the devices H and J of the individual feed systems A and B, will now be described. The specific structure here disclosed is of a type which has been found to be exceedingly valuable for use in this system, but it must be borne in mind that, from the point of view of the system as a whole, other specifically different devices could be employed.

Figure 3:
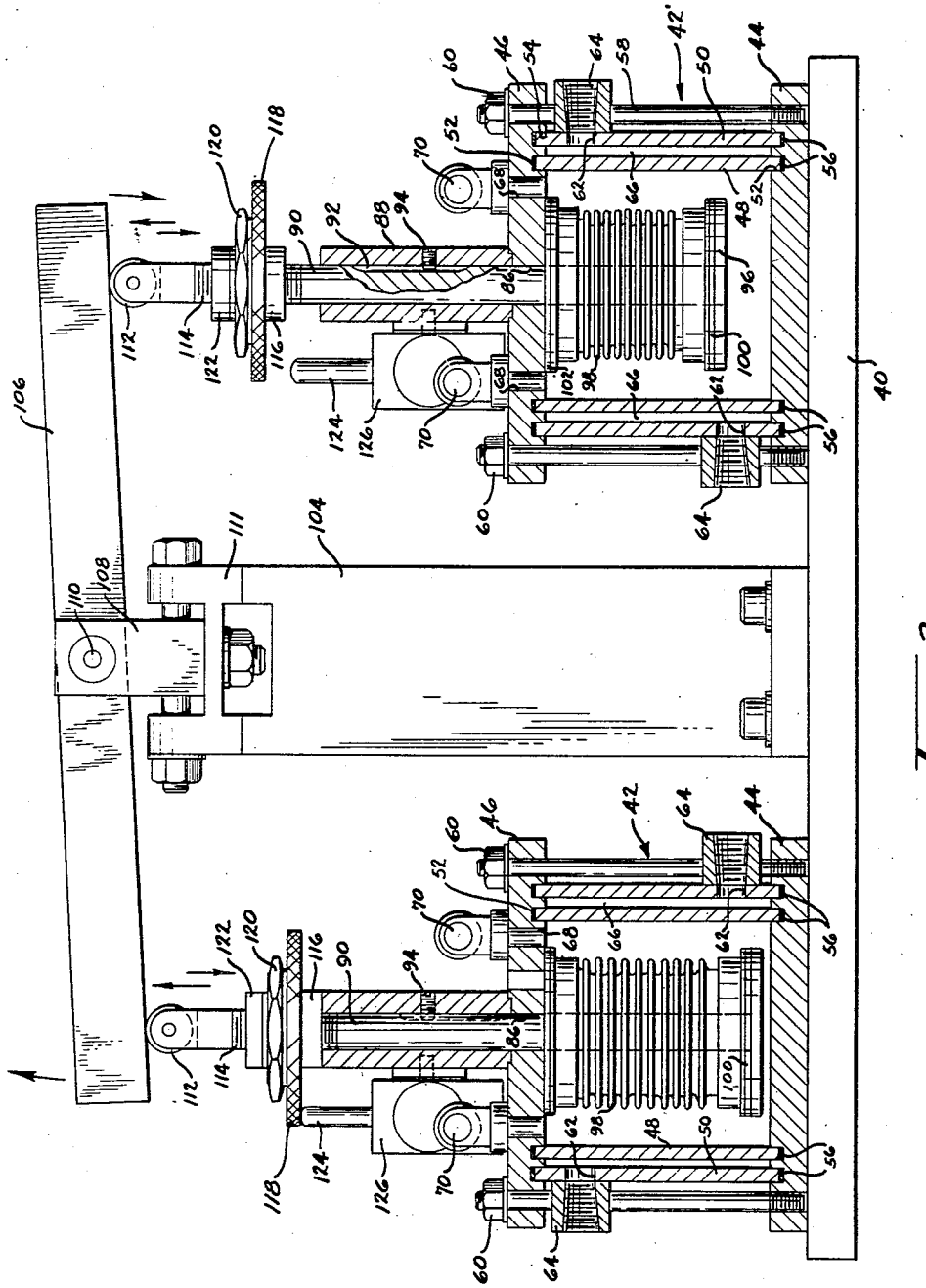
Fig. 3 is a cross sectional view of one of the sets of bellows-type pumps which is employed to meter the flow of the individual substances.
Figure 4:
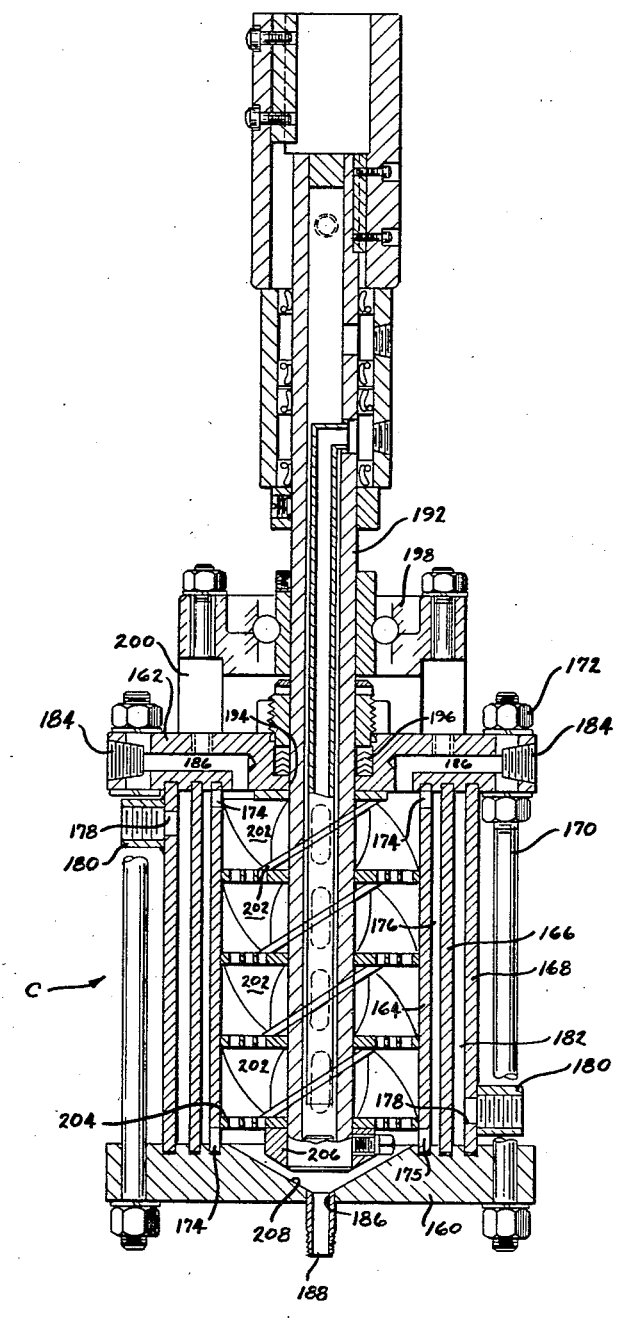
Fig. 4 is a cross sectional view of the mixer use of which is preferred in the instant system.

Each metering device H, as may best be seen from an examination of Fig. 3, comprises a base plate 40 on which a pair of cylinders generally designated 42, 42' are mounted. Each of these cylinders comprises a bottom wall 44 and a top wall 46 between which a pair of inner and outer shells 48 and 50 are sealingly retained, the upper and lower edges of those shells being received within grooves 52, 54 in the bottom and top walls 44 and 46 and those grooves being filled with sealing material 56. The entire assembly is held together by stud bolts 58 and nuts 60.

The inner shell 48 is imperforate, while the outer shell 50 is provided with a pair of apertures 62 leading to threaded nipples 64, the nipples in turn being adapted to be connected to a source of heated fluid adapted to be circulated through the space 66 between the shells 48 and 50 so as to maintain the contents of the inside of the shell 48 at a predetermined temperature.

The top plate 46 is provided with a pair of apertures 68 which communicate with fittings 70, both being connected (in the system of Fig. 1) by line 72 to a four-way valve J. Line 74 is tapped into line 72 and leads to valve 76 and line 78, the line 78 leading to a vacuum trap 80 which is in turn connected, by means of line 82 and valve 84, to a source of vacuum.

The top wall 46 is further provided with a central aperture 86 and with an upstanding sleeve 88 through which bellows rod 90 is adapted to slide, that rod being provided with a keyway 92 within which set screw 94 on the sleeve 88 is adapted to ride. The lower end of the bellows rod 90 extends down into the interior of the space within the inner shell 48, where it is connected to a bottom plate 96 to which the lower end of metallic bellows 98 is connected via a sealing gasket 100. The upper end of the bellows 98 is connected to the undersurface of the top plate 46 with sealing gasket 102 interposed therebetween. The seals between the upper end of the bellows 98 and the top cylinder plate 46 on the one hand and the lower end of the bellows 98 and the bottom bellows plate 96 on the other hand completely enclose the bellows rod 90 and the aperture 86, so that the sliding fit between the bellows rod 90 and the remainder of the unit need not be airtight.

Each of the cylinders 42 and 42' are mounted on opposite sides of an upright 104. A pivot bar 106 is pivotally mounted on bracket 108 so as to pivot about axis 110, the bracket 108 in turn being adjustably mounted on the upright 104 by means of yoke 111. The upper ends of each of the bellows rods 90 is provided with a roller 112 in engagement with the undersurface of the pivot bar 106 on opposite sides of its pivotal axis 110. Thus whenever the bellows rod 90 of one of the cylinders 42 or 42' rises the bellows rod 90 of the other of the cylinders will be depressed. As will be apparent from Fig. 3, the risen bellows rod 90 (see the right hand side of Fig. 3), will compress the bellows 98 and thus increase the volume inside the inner shell 42 which is available for the substance being metered, while the depressed bellows rod 90 (see the left hand side of Fig. 3) will expand its bellows 98 and thus cause the volume within the inner shell 48 available for the substance being fed to decrease. Upper intermediate portions of the bellows rod 90, designated 114, are externally threaded and on those rod portions 114 are mounted an assembly comprising a lower stop nut 116, a tripper disk 118, a check nut 120 and a second check nut 122. Through appropriate rotation of the nuts 116, 120 and 122 each entire assembly may be longitudinally shifted along its bellows rod 90 so as to limit the extent to which that bellows rod can be lowered into the cylinder 42 or 42'. In this way the degree to which the bellows 98 may be extended may be positively limited, the stop nut 116 engaging the upper surface of the sleeve 88 when that limit has been reached, as may be seen at the left hand side of Fig. 3. This in turn controls the volume of material which will be expelled from the cylinder 42 or 42' when the bellows 98 is expanded. The tripper disk 118 is employed to engage and depress the plunger 124 of a microswitch 126 mounted on the sleeve 88. The plunger 124 will be depressed, thus actuating the switch 126, only when the bellows rod 90 associated therewith has reached the end of its downward travel.

The four-way valve J of Fig. 1 has four ports, two of which are connected with the lines 72 communicating with the interior of the respective cylinders 42 and 42'. A third port communicates with the line 30 leading from the reservoir G. A fourth port communicates with lines 128 and 130, the latter having a valve 132 and feeding into the mixer C. The valve J has two positions of operation, and its movement between one position and the other is controlled by an air motor 134 actuated by a solenoid 136. In one position of the valve J the line 30 is connected with the line 72 of the left hand cylinder 42, while the line 72 of the right hand cylinder 42' is connected with the line 128. In this position of the valve the substance in an individual feed system A or B will, by reason of the pressure applied thereto within the reservoir G, force its way into the left hand cylinder 42, thus causing that bellows 98 to contract and lifting the bellows rod 90 associated therewith. This will, through the pivot bar 106, force the bellows rod 90 of the right hand cylinder 42' to move downwardly, expanding the bellows 98 and forcing the substance inside its inner shell 48 to be expelled from the cylinder 42' through the lines 72, 128 and 130 into the mixer C. The volume of material expelled from the cylinder 42' and fed into the mixer C will be limited by the degree to which the bellows 98 in the left hand cylinder 42 is expelled, and that in turn is controlled by the setting of the stop nut 116 on its bellows rod 90.

In the other position of the valve J the connections to the cylinders 42 and 42' are reversed, pressure-fed material is forced into the right hand cylinder 42' causing its bellows 98 to contract and lifting its rod 90, the rod 90 in the left hand cylinder 42 is forced down, expanding its bellows 98, and a corresponding amount of material is forced out of the left hand cylinder 42 to the mixer C.

Thus each pair of cylinders 42, 42' may be individually adjusted so that, for each cycle of its operation a predetermined amount of resin or hardener is metered, the amount of metered substance for one pair of cylinders 42, 42' being independent of the amount of material for the other pair of cylinders 42, 42'.

The interlock between the valves J controlling the cylinders 42, 42' in the individual feed systems A and B is here shown as being accomplished electrically by means of the solenoids 136 and the microswitches 126. As may best be seen from Fig. 1, each solenoid is provided with three terminals 138, 140 and 142, the central terminal being grounded and the outer terminals being operative, when selectively energized, to condition the solenoid 136 in opposite senses, thus controlling the air motor 134 and causing the valve J to be shifted from one position to another. The contacts 138 on each of the solenoids 136 of the feed system A and B are connected together, and an external circuit between them and the high potential side of a source of D. C. power 144 is defined by line 146, the normally open microswitch 126 for the right hand cylinder 42' in the feed system, the line 148, the normally open microswitch 126 for the cylinder 42' in the feed system B, and line 150. The terminals 142 of the two solenoids 136 are connected together and to the high potential side of the power source 144 by means of line 152, the normally open microswitch 126 for the left hand cylinder 42 in the feed system A, the line 154, the normally open microswitch 126 on the corresponding cylinder 42 of the feed system B, and the line 156. Since the circuits either to the terminals 138 or 142 of the solenoids 136 are closed only when both corresponding microswitches 126 in the individual feed system A and B are closed, and since neither of the valves J will be shifted to a new position until the corresponding terminals 138 or 142 have been energized, which energization will always take place simultaneously, it will be seen that no matter how soon the metering device H in one of the feed systems may complete its cycle, that is to say, may measure a predetermined amount of material and cause it to be fed to the mixer C, it cannot recycle and feed another such predetermined amount of substance until the other metering device H has completed its cycle. Assuming that the solenoid terminals 142 have been energized, thus causing the valve J to assume one position, the valve will remain in that position until the solenoid terminals 138 have been energized. This cannot happen until both of the previously deactuated and normally open microswitches 126 have been actuated and closed, and this can only take place after both of the measuring devices H have cycled.

The purpose of the line 74, valve 76, line 78, vacuum trap 80, line 82 and valve 84 communicating with a source of vacuum is to assist in the evacuation of the system prior to filling, as will be described below.

Figure 2:
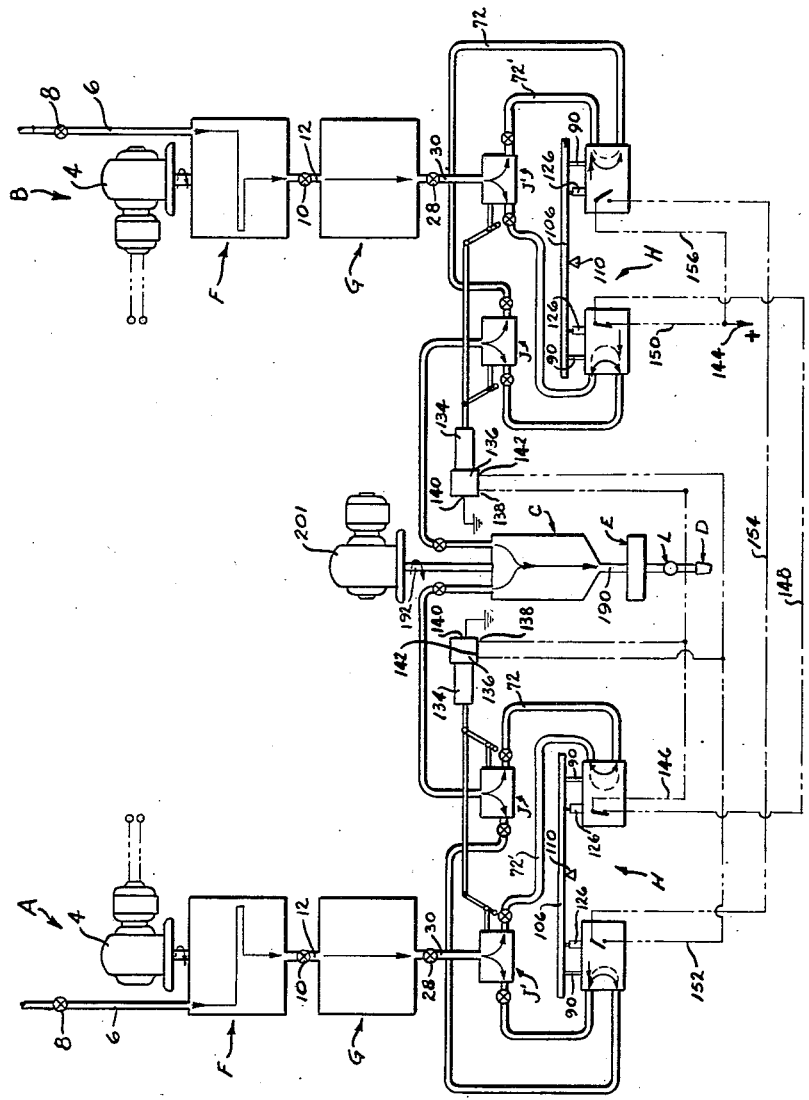
Fig. 2 is a schematic view of an alternative embodiment thereof.

The system of Fig. 2 (here illustrated in somewhat simplified form) is substantially the same as the system of Fig. 1 except that, instead of employing a single four-way valve J for each individual feed system A and metering device H, a pair of mechanically linked three-way valves J, J' are provided. This requires that each of the fittings 70 on the cylinders 42 and 42' be individually utilized for the passage of the individual substances therethrough, being connected respectively to lines 72 and 72' leading to different valves J or J'.

Mixer

In the continuous system here disclosed the contents of the mixer C are replenished when and to the same extent as mixed material is withdrawn therefrom. It has been found that under these circumstances the "pot life" of the mixed material is restored provided that the replenishment rate reaches a known value which is considerably less than the total volume of the mixing chamber, and provided that the newly introduced material is thoroughly mixed with the remaining material. It has been found that continuous agitation of the mixed material, and preferably a continuous circulation thereof through the mixer, facilitates the attainment of this restored "pot life." Any mixer satisfying these requirements would be satisfactory for use in the system. The specific design here described has been found particularly effective in this regard. The mixer C as illustrated comprises a bottom plate 160 and a top plate 162, with three concentric shells 164, 166 and 168 sealingly mounted between them, the entire assembly being held together by means of studs 170 and nuts 172. The intermediate shell 166 is imperforate. The inner shell 164 is provided with apertures 174 and 175 at the top and bottom thereof respectively, so that the space 176 between the shells 164 166 communicates with the space inside the shell 164. The outer shell 168 is provided with a pair of apertures 178 communicating with nipples 180 so that a suitable heated fluid can be circulated through the space 182 between the shells 166 and 168, thus maintaining the contents of the mixer C at a predetermined temperature. The top plate 162 is provided with a pair of ports 184 which open onto passages 186 communicating with the interior of the shell 164. The lines 130 from the respective individual feed systems A and B are connected respectively to the ports 184, so that resin is fed through one port and hardener is fed through the other port. The bottom plate 160 is provided with a central aperture 186 in which nipple 188 is fitted to define an exit from the mixer C, line 190 connecting the nipple 188 to the dispensing nozzle D.

A hollow shaft 192 extends through an aperture 194 in the top plate 162, where it is sealed by means of packing 196. The upper end of the rod is journaled in anti-friction bearing 198 mounted on studs 200 and is connected to driving motor 201. The lower end of the shaft 192 which extends axially through the space inside the shell 164 carries a plurality of sets of impeller blades 202, each set being axially spaced from the other and apertured strainer plates 204 being interposed between the sets of impeller blades 202, non-rotatably retained inside the shell 164, and with respect to which the shaft 192 is freely rotatable. The lowermost strainer plate 204 is held in axial position by means of a collar 206 fixed to the lower end of the shaft 192. The upper surface of the bottom plate 160 may be cut away as at 208, so as to provide clearance for the collar 206 and produce a funnel-like passage to the exit nipple 188. A valve E or other dispensing control device, which may be openable or closeable manually or by remote control, is interposed in the line 190 so that dispensing or mixed material may be initiated or terminated at will. It is preferred, both for reasons of ease of manual control and integration with the purge control system K, that the valve E be solenoid-actuated, the solenoid V therefor being energized either by a switch SW under control of the operator or by the purge control system K.

When that valve E is closed, that is to say, when no material is being dispensed, and when the system is full, the material in the mixer C is constantly being mixed and circulated therethrough, being forced downwardly through the strainer plates 204 by means of the impeller blades 202, then passing through the lower apertures 175, upwardly through the space 176, and in again through the upper apertures 174. The pressure exerted by the individual substances in the reservoirs G tends to feed those substances into the mixer C, but since the substances are substantially incompressible they cannot enter the mixer C when the latter is full. However, as soon as any mixed material is dispensed from the mixer C, and simultaneously therewith, feeding of the individual substances thereinto will automatically resume in order to keep the mixer full, and the relative quantities of the materials fed thereinto will be determined by the action of the metering devices H in the individual feed systems A and B and by the interlock therebetween as described above.

In order to provide for initial vacuumization of this part of the system, a line 210 communicates with the interior of the shell 164 at one end and, via valve 212 at its other end, with a vacuum trap 214 and a line 216 to which a vacuum source is connected.

Operational procedure

The manner of use of the system of the present invention in dealing with production quantities of resin and hardener will now be described and from this description numerous advantages thereof from a practical point of view will become apparent.

When the system is first to be prepared for operation, the individual substances are deaerated in the deaeration chambers F and transferred to their respective reservoirs G, the valve 28 remaining closed. Then, by opening the valves 76, the cylinders 42, 42', the valve J, and all of the feed lines between the valves 28 and the valves 132 are evacuated. When the proper degree of vacuum has been attained, pressure is applied to the contents of the reservoir G by opening the valve 36, and then the valve 28 is opened. The valves J are shifted from side to side until resin is drawn into the vacuum trap 80 from each of the cylinders 42, 42' and their respective piping. The valves 76 are then closed, the valve 212 is opened, and the mixer C and the piping from closed valves 132 to closed valve E is evacuated. When the proper degree of vacuum is achieved the valve 132 and the by-pass valve 302 in the resin feed system A are opened, and evacuation of the mixer C is continued until resin is drawn into the vacuum trap 214. Only resin is fed into the mixer C at this point because this operation is usually carried out well in advance of any actual dispensing, and the risk of having material set while inside the mixer C is to be avoided. At the end of this operation the by-pass valve 302 and the vacuum valve 212 are closed.

It is preferred that all or most of these operations be automatically interlocked, by means of appropriate electrical circuits, so that deaeration of the hardener or resin cannot proceed at the same time the substances are being transferred to their reservoirs, transfer of materials to the reservoir cannot proceed while metering, mixing or dispensing is going on, metering, mixing and dispensing cannot proceed while materials are being transferred from the deaerator to the reservoir, and no substance is introduced into a space that has not been properly vacuumized.

The system as thus set up for operation can stand indefinitely, since the resin and hardener are not mixed at any point and since the individual substances have substantially indefinite "pot lives." If the system is not to be used for an appreciable period of time it is preferred that the valves 36 be closed and the valves 24 be opened in order to evacuate the reservoirs G.

At the start of the work day the reservoirs G for the resin and hardener will normally contain a full supply, deaerated during the previous day's operation and transferred to the reservoirs G after the termination of the dispensing of the previous day. The mixer C, as set forth above, contains only resin. The valves 36 are opened and pressure is applied to the material in the reservoirs G. The valve 132 in the resin supply system A is closed, the corresponding valve 132 in the hardener supply system B is opened, and by-pass valve 302 in the hardener supply system B is opened, permitting direct flow of hardener to the mixer C without having to pass through the metering device H. The dispensing valve E is opened, thus permitting the contents of the mixer C to escape and permitting hardener to enter the mixer C, the mixer motor 201 having previously been started. This procedure is continued until the required proportion of hardener has been added to the resin in the mixer C, as determined in any appropriate manner, as by analysis of the contents of the dispensed mixture. The valve 302 is then closed, the valve 132 in the resin feed system A is opened, and the complete system is ready to operate.

During operation some means must be provided for preventing the hardening or setting of the resin-hardener mixture within the mixer C. One arrangement for accomplishing this result is disclosed in Fig. 5, and involves the use of three timers 230, 232 and 234, all of which may be of conventional design. In one particular installation the timer 230 is Style 5602-A timer manufactured by Automatic Temperature Control, Inc. of Philadelphia, Pa., and the timers 232 and 234 are Style 2865 timers manufactured by the same concern. The timer 232 is connected so as to measure the time during which dispensing takes place, and is called the "flow" timer. The timer 234 measures the elapsed time, and is called the "pot life" timer. The timer 230 is called the "delay" timer because it provides a predetermined short time delay in order to ensure that the timers 232 and 234 properly reset themselves.

Each of the timers is provided with a clutch CL and a motor M, the clutch CL, when energized, connecting the motor to the particular timing arrangement and the timing arrangement, in turn, actuating certain switches after a predetermined time has been measured. The dispensing valve E is normally closed and is adapted to be opened by an electrically energized instrumentality V such as an electromagnet. The operator is provided with a switch SW which is normally open but which, when closed and when the controls are properly set, will energize the instrumentality V and cause the dispensing valve E to open.

Fig. 5 shows the various timer switches in the position which they will assume when the system is ready for operation. The delay timer 230 has a normally open switch 236 and a normally closed switch 238, these switches being operatively connected to the motor M so that whenever the motor M will have driven the timing mechanism (not shown) a predetermined period of time on the order of two seconds or so, the switch 238 will be opened and the switch 236 will close, the switches remaining in those positions until the clutch CL is de-energized, after which they reset to their original open and closed conditions respectively.

The flow timer 232 has a switch 240 normally connecting terminals 242 and 246. However, whenever its clutch CL is energized the switch 240 shifts to connect terminals 242 and 244, remaining in that position until the motor M of the flow timer 232 has driven the timing mechanism (not shown) for a predetermined period of time, the motor M then shifting the switch 240 back to its original position. The flow timer 232 also has a normally open switch 241 which is closed by the clutch CL of timer 232 whenever the latter is energized, thus holding the clutches CL of timers 232 and 234 energized.

The "pot life" timer 234 has a switch 236 which is normally open but which is operatively connected to the clutch CL so that whenever the clutch is energized the switch 236 will close. It is further provided with a normally open switch 238 which, after the motor M has moved the timing mechanism (not shown) for a predetermined period of time, will be closed. The structure of the timers is such that whenever their respective clutches CL are de-energized the timing mechanism will reset to zero.

With the timing arrangement in its normal operating condition as shown in Fig. 5, and with the lines L₁ and L₂ being energized, the clutches CL of the flow timer 232 and the pot life timer 234 will both be connected across the lines L₁ and L₂ via the switch 241 so that they will be energized. Energization of the clutch of timer 234 closes switch 236, thus energizing the motor M of the timer 234 through the switch 236, and the switch 240 of the timer 232. So long as the switch SW is in the position shown, the motor M of the timer 232 is not energized. Consequently the pot life timer 234 will measure elapsed time, and the other timers will be ineffective.

When dispensing is desired the operator will shift switch SW from the position shown in solid lines to the position shown in broken lines. This will have several effects. First, the actuating instrumentality V for the dispensing valve E will be energized via the switch SW and the switch 240. Secondly, the motor M of the timer 232 will be energized via the switch SW and the switch 240. The motor M of the timer 234 will remain energized through the action of the jumper 248 which forms a part of the switch SW. Hence, while dispensing is taking place, the timer 232 will be measuring the time. When dispensing ceases, the switch SW being returned to its full line position, the motor M of the flow timer 232 will be de-energized but, since the clutch CL of the timer 232 is still energized, that timer will retain the setting which it has reached.

As will be apparent from the discussion above, the timers 232 and 234 will be set for values of dispensing time and elapsed time respectively such as to ensure that proper replenishment of the contents of the mixer C takes place in order to have the pot life of the mixer's contents restored. That pot life may be, for example, thirty minutes, allowing for reasonable factors of safety, and the timer 234 will accordingly be set for that period of time. In one particular installation, where the mixer volume is thirty cubic inches and where replenishment of half of the contents thereof has been shown to restore the pot life of the entire contents, a dispensing time of ten minutes has been found to produce such replenishment, and consequently the flow timer 232 may be set for ten minutes.

During normal use of the system the flow timer 232 will measure ten minutes before the pot life timer 234 measures thirty minutes. When that occurs the switch 240 will be actuated to break the circuit between terminals 242 and 246 and the switch 241 will be opened, de-energizing the clutches CL of the timers 232 and 234 and permitting both to reset. The breaking of the circuit between 242 and 244 will de-energize the motor M of the timer 234 and also, if the switch SW is still closed, of the motor M of the timer 232 itself. The making of the circuit between 242 and 246 will energize the clutch CL and motor M of the delay timer 230. This situation will continue until the delay timer 230 has timed out, which period may be approximately two seconds. Then the switch 238 will be opened, de-energizing the motor M of the delay timer 230 and the switch 236 will be closed, again energizing the clutches CL of the timers 232 and 234. Energization of the clutch CL of timer 232, as has already been mentioned, closes switch 241 to retain the clutches energized. Also switch 240 shifts, de-energizing the clutch CL of delay timer 230 and thus permitting the delay timer switches 236 and 238 to resume their normal position. It will thus be seen that the delay timer postpones re-energization of the timers 232 and 234 for a short period of time, thus ensuring them an adequate opportunity to reset.

Should the dispensing of the mixed material not be adequate to restore the pot life thereof within the thirty minutes measured by the timer 234, the timer 234 will time out before the timer 232. This will cause the switch 238 to close. The energizing instrumentality V for the dispensing valve E will be energized via switch 238, thus causing dispensing to take place automatically. At the same time, the motor M of the flow timer 232 is energized via lines 250, 252 and switch 238. The automatic purge will continue until the timer 232 has timed out, thus indicating that the pot life of the contents of the mixer C has been replenished, at which time the delay timer will be energized and the timers 232 and 234 de-energized and reset, with accompanied opening of the switch 238, as previously described.

If the dispensing nozzle D is in an inconvenient position at the time when the automatic purge is taking place, the operator closes a normally open valve L so as to positively prevent dispensing until the nozzle D has been transferred to a more convenient location, such as a purge can. The period of time here involved is a matter of only a few seconds, and no compensation is made therefore in the system as here disclosed. If any more appreciable time were involved, an interlock could be provided between the valve L and the energizing circuit for the motor M of the timer 232, by means of which the circuit to that motor would be opened whenever the valve L is closed.

If, during the day's operation, the level of either the resin or hardener in its reservoir G should fall below a predetermined level, a device 254 in the reservoir will indicate this and will give an appropriate warning to the operator of this system. Since it may take a long time to replenish the supply of substance in the depleted reservoir G, it is preferred that the sensing device 254 also automatically actuate the timing arrangement K so as to provide a period of grace at least equivalent to the full "pot life" of the mixed material. Fig. 6 schematically discloses an arrangement by which this may be accomplished. Three control circuits are utilized, one between $L_3$ and ground, another between $L_4$ and ground, and another between $L_5$ and $L_6$. Whenever either of the sensing devices 254 is actuated by detecting an excessively low level of substance in its reservoir, a circuit will be closed between $L_3$ and ground, actuating an alarm 256. At the same time a circuit between $L_4$ and ground through an appropriate indicating lamp 258 will be closed, causing the lamp corresponding to the appropriate reservoir G to light, thus indicating to the operator which reservoir is depleted. Simultaneously a normally open relay 260 will be closed, energizing the actuating instrumentality V for the dispensing valve E and starting an automatic purge of the system and also appropriately energizing the timing mechanism K. That timing mechanism is here schematically illustrated, for purposes of simplification, as including a flow timer 232 and a pot life timer 234 alternately connected between $L_1$ and $L_2$ by means of a switch 262 which normally energizes the pot life timer 234 and which may be moved to a position energizing the flow timer 232 upon energization of the electromagnet 264, the latter being connected in parallel with the actuating instrumentality V for the dispensing valve E and being energized whenever the latter is energized. Thus the purge will take place until the flow timer has timed out, at which time appropriate circuits will be broken in order to terminate the purge. It will be appreciated that the closing of the manually operated switch SW will also connect the instrumentality V and the electromagnet 264 across the lines $L_5$ and $L_6$ independently of the action of the automatic system just described.

At the completion of the day's run of work the mixer C must be purged of hardener to an extent sufficient to permit the system to be shut down until the following working day. The "pot life" of the residual contents of the mixer C must be greater than the expected shutdown period. To this end the valve 132 in the hardener supply system B is closed and the by-pass valve 302 in the resin supply system A is opened, after which the dispensing valve E is opened and the dispensing nozzle D is placed within a purge can. Purging is permitted to continue until the desired composition of mixed content is attained. A typical procedure involves the discard of one mixer volume of mixed material and the continued purge of the mixer and subsequent salvage of the next four or five volumes dispensed in this purge operation. The dilution factor is then usually satisfactory for the required shutdown. The purging is stopped and the equipment secured.

In any given installation, with the volume of the mixer C known and the rate of dispensing known, it will be apparent that this "shutdown purge" can be accomplished automatically by means of appropriate timing devices. Fig. 6 discloses the incorporation of this automatic "shutdown purge" control into the automatic system initiated by the detection of the depletion of a given reservoir G. Whenever either of the devices 254 close, a time delay device 266 is energized, that device being set for a period of time determined by the pot life of the material in the mixer C, the time required to complete the automatic purge to restore that pot life, and any desired safety factors. After such a predetermined period of time has elapsed, a second alarm 268 is energized, notifying the operator that unless the contents of the depleted reservoir G are promptly replenished, a "shutdown purge" will be automatically initiated. A time delay switch 270 will then, after a predetermined period of time, energize the actuating mechanism generally designated 272 which causes the "shutdown purge" to be initiated and completed.

From the above it will be seen that the present system provides for continuous metered mixing of two or more substances in predetermined volumes and the dispensing thereof either automatically or under manual control, the system being completely integrated to meet and satisfy all production problems and preferably having its various operations automatically controlled and interlocked so that the system is virtually fool-proof. A single operator can control the entire system and the mixed material produced by the system will be of reliably uniform composition and have reliably uniform characteristics.

The system of the present invention has been here disclosed in only one basic form, as particularly adapted for the production line embedment of electrical components or subassemblies in a substance comprising a thermosetting resin mixed with a hardener. Other fields of application for the instant apparatus or modifications thereof are in the production of castings, the application of coatings for sealing, adhering, protecting or decorating purposes, the manufacture of laminations, molded products or thermosetting extrusions. Many of the more complex aspects of the instant disclosure may readily be eliminated in situations where they are not required. For example, when resins of water-like viscosity are employed there is little or no need for the deaeration step. Where a given installation is not required to handle a wide diversity of materials, many of the controls and components here disclosed may be eliminated or simplified. It thus will be apparent that many variations may be made in the system here disclosed, all within the spirit of the invention as defined in the following claims.

I claim:

1. A metered mixing system for mixing two substances in predetermined proportions comprising two separate feed systems, one for each substance, and each including a cyclical measuring and dispensing unit effective on each cycle to dispense a predetermined amount of a given substance, and a double-acting interlock operatively connected between said units and effective to prevent either unit from recycling until the other unit has completed its cycle, said cyclical measuring and dispensing units comprising positive displacement pumps to which two-position valves are operatively connected to control the output therefrom, movement of each valve from one position to another permitting the associated pump to dispense another quantum of the substance associated therewith, said interlock being sensitive to the condition of each of said pumps relative to the end of its cycle and operatively connected to said valves so as to initiate a new cycle of said pumps only after both said pumps have completed their original cycle.

2. The metered mixing system of claim 1, in which said pumps comprise an inlet, an outlet, and two chambers of variable size operatively connected by a movable element so that as the volume of one chamber increases the volume of the other chamber decreases, said valves in their various positions alternately connecting the inlets and outlets of said pumps to opposite chambers, and means active on the substance in each feed system to force it into the corresponding pump inlet, whereby the forced material constitutes the sole source of motive power active on the pumps to cause them to cycle.

3. A metered mixing system for mixing two substances in predetermined proportions comprising two separate feed systems, one for each substance, and each including a cyclical measuring and dispensing unit effective on each cycle to dispense a predetermined amount of a given substance, and a double-acting interlock operatively connected between said units and effective to prevent either unit from recycling until the other unit has completed its cycle, said cyclical measuring and dispensing units comprising an inlet, an outlet, and two chambers of variable size operatively connected by a movable element so that as the volume of one chamber increases the volume of the other chamber decreases, said valves in their various positions alternately connecting the inlets and outlets of said units to opposite chambers, and means active on the substance in each feed system to force it into the corresponding unit inlet, whereby the forced material constitutes the sole source of motive power active on the units to cause them to cycle.

4. A metered mixing system for mixing two substances in predetermined proportions comprising two separate feed systems, one for each substance, and a common receptacle into which each of said feed systems empties, said receptacle being closed and of fixed volume and having means associated therewith for stopping and permitting dispensing, said feed systems each including a cyclical measuring and dispensing unit effective on each cycle to dispense a predetermined amount of a given substance into a conduit means extending therefrom to said receptacle, said conduit means also being closed and of fixed volume, and a double-acting interlock operatively connected between said units and effective to prevent either unit from recycling until the other unit has completed its cycle, whereby when said receptacle and said conduit means are filled and said substances therein are substantially incompressible, said units will not recycle even though conditioned to do so by said interlock until material has been dispensed from said receptacle.

5. The metered mixing system of claim 4, in which said units comprise positive displacement pumps to which two-position valves are operatively connected to control the output therefrom, movement of each valve from one position to another permitting the associated pump to dispense another quantum of the substance passing therethrough, said interlock being sensitive to the condition of each of said pumps relative to the end of its cycle and operatively connected to said valves so as to initiate a new cycle of said pumps only after both said pumps have completed their original cycle.

6. The metered mixing system of claim 4, in which said units comprise positive displacement pumps to which two-position valves are operatively connected to control the output therefrom, movement of each valve from one position to another permitting the associated pump to dispense another quantum of the substance passing therethrough, said interlock being sensitive to the condition of each of said pumps relative to the end of its cycle and operatively connected to said valves so as to initiate a new cycle of said pumps only after both said pumps have completed their original cycle, and in which said pumps comprise an inlet, an outlet, and two chambers of variable size operatively connected by a movable element so that as the volume of one chamber increases the volume of the other chamber decreases, said valves in their various positions alternately connecting the inlets and outlets of said pumps to opposite chambers, and means active on the substance in each feed system to force it into the corresponding pump inlet, whereby the forced material constitutes the sole source of motive power active on the pumps to cause them to cycle.

7. A metered mixing system for mixing two substantially incompressible substances in predetermined proportions comprising two separate feed systems, one for each substance, each feed system comprising a reservoir, a measuring and dispensing unit connected thereto, a common receptacle into which each unit empties, and connections between said units and said receptacle, and means active on each of said substances to force them from their reservoirs to said receptacle, said receptacle and said connections being closed and of fixed volume, said means being effective to maintain said units, connections and receptacle full of said substances, and said receptacle having means associated therewith for stopping or permitting dispensing independently of said feed systems.

8. In the system of claim 7, a two-way-acting operative connection between the measuring and dispensing units of each feed system effective to cause each to function in synchronism with the other.

9. In the system of claim 7, timing means operatively connected to said dispensing means and effective to cause at least a predetermined amount of material to be dispensed therefrom within a predetermined time interval independently of manual actuation of said dispensing means.

10. In the system of claim 7, a manual control and an automatic control for said dispensing means, and an operative connection between said control means whereby said automatic control is rendered effective to cause a predetermined amount of material to be dispensed from said receptacle within a given time interval whenever said predetermined amount of material is not dispensed therefrom within said time interval through actuation of said manual control.

11. In the system of claim 7, a by-pass between the reservoir of one of said feed systems and said common receptacle, and a control valve in said by-pass.

12. In the system of claim 7, a primary control for said dispensing means, and an automatic control for said dispensing means comprising a first element measuring the amount of material dispensed and a second element measuring time, said second element being operatively connected to said dispensing means and effective to cause the latter to dispense material after a predetermined time period has been measured thereby, said first element being operatively connected to said second element and effective to reset itself and said second element whenever it measures a predetermined amount of material dispensed from said receptacle.

13. In the system of claim 12, a third element actuated by said first element whenever the latter measures said predetermined amount of material dispensed and active on said second element to interrupt its time measurement for a short interval.

14. In the system of claim 12, sensing means in a reservoir actuated when the amount of material therein reaches a predetermined minimum, and an operative connection between said sensing means and said dispensing means effective, when said sensing means is actuated, to cause said dispensing means to dispense material from said receptacle until said first element has measured said predetermined amount of material.

15. In the system of claim 12, sensing means in a reservoir actuated when the amount of material therein reaches a predetermined minimum, an operative connection between said sensing means and said dispensing means effective, when said sensing means is actuated, to cause said dispensing means to dispense material from said receptacle until said first element has measured said predetermined amount of material, and manual means for preventing dispensing of material from said receptacle.

16. In the system of claim 7, in which said dispensing means establishes a known rate of flow of material, a primary control for said dispensing means, and an automatic control for said dispensing means comprising first and second timers, said first timer measuring the time during which material is dispensed and said second timer measuring elapsed time, said second timer being operatively connected to said dispensing means and effective to cause the latter to dispense material after a predetermined elapsed time has been measured thereby, said first timer being operatively connected to said second timer and effective to reset itself and said second timer whenever it measures a predetermined period of time corresponding to a predetermined amount of material dispensed from said receptacle.

17. In the system of claim 16, a third timer actuated by said first timer whenever the latter measures said predetermined period of time and active on said second timer to interrupt its timed measurement for a short interval.

18. In combination, a receptacle adapted to retain a supply of material, dispensing means associated with said receptacle, a primary control for said dispensing means, and an automatic control for said dispensing means comprising a first element measuring the amount of material dispensed and a second element measuring time, said second element being operatively connected to said dispensing means and effective to cause the latter to dispense material after a predetermined time period has been measured thereby, said first element being operatively connected to said second element and effective to reset itself and said second element whenever it measures a predetermined amount of material dispensed from said receptacle.

19. In the combination of claim 18, a third element actuated by said first element whenever the latter measures said predetermined amount of material dispensed and active on said second element to interrupt its time measurement for a short interval.

20. In combination, a receptacle adapted to contain a supply of material, dispensing means associated with said receptacle and establishing a known rate of flow of said material, a primary control for said dispensing means, and an automatic control for said dispensing means comprising first and second timers, said first timer measuring the time during which material is dispensed and said second timer measuring elapsed time, said second timer being operatively connected to said dispensing means and effective to cause the latter to dispense material after a predetermined elapsed time has been measured thereby, said first timer being operatively connected to said second timer and effective to reset itself and said second timer whenever it measures a predetermined period of time corresponding to a predetermined amount of material dispensed from said receptacle.

21. In the combination of claim 20, a third timer actuated by said first timer whenever the latter measures said predetermined period of time and active on said second timer to interrupt its timed measurement for a short interval.

22. In the system of claim 7, means sensitive to the condition of the material in said receptacle and effective to cause at least a predetermined amount of material to be dispensed therefrom when said condition attains a predetermined character.

23. In combination, a receptacle adapted to retain a supply of material, dispensing means associated with said receptacle, a primary control for said dispensing means, and an automatic control for said dispensing means comprising a first element measuring the amount of material dispensed and a second element sensing the condition of the material in said receptacle, said second element being operatively connected to said dispensing means and effective to cause the latter to dispense material when the condition of the material in said receptacle attains a predetermined character, said first element being operatively connected to said dispensing means and effective to terminate dispensing initiated by said second element after a predetermined amount of material has been dispensed.

24. The system of claim 7, in which the means forcing said substances from their reservoirs to said receptacle is active on said substances in advance of said measuring and dispensing units, said measuring and dispensing units being powered solely by said forced substances, whereby said measuring and dispensing units are powered solely by the substances forced therethrough.

25. A metered mixing system for mixing two substantially incompressible substances in predetermined proportions comprising two separate feed systems, one for each substance, each feed system comprising a reservoir, a measuring and dispensing unit connected thereto, and a common receptacle into which each unit empties, means active on each of said substances to force them from their reservoirs to said receptacle, said receptacle being closed and of fixed volume and having dispensing means associated therewith, means in said receptacle for continuously mixing and circulating said substances therethrough independently of the dispensing of material therefrom, and timing means active on said dispensing means and effective to cause at least a predetermined amount of material to be dispensed therefrom within a predetermined time interval independently of manual actuation of said dispensing means.

26. A metered mixing system for mixing two substantially incompressible substances in predetermined proportions comprising two separate feed systems, one for each substance, each feed system comprising a reservoir, a measuring and dispensing unit connected thereto, and a common receptacle into which each unit empties, means active on each of said substances to force them from their reservoirs to said receptacles, said receptacle being closed and of fixed volume and having dispensing means associated therewith, means in said receptacle for continuously mixing and circulating said substances therethrough independently of the dispensing of material therefrom, a manual control and an automatic control for said dispensing means, and an operative connection between said controls whereby said automatic control is rendered effective to cause a predetermined amount of material to be dispensed from said receptacle within a given time interval whenever said predetermined amount of material is not withdrawn therefrom within said time interval through actuation of said manual control.

27. A metered mixing system for mixing two substantially incompressible substances in predetermined proportions comprising two separate feed systems, one for each substance, each feed system comprising a reservoir, a measuring and dispensing unit connected thereto, and a common receptacle into which each unit empties, means active on each of said substances to force them from their reservoirs to said receptacle, said receptacle being closed and of fixed volume and having dispensing means associated therewith, means in said receptacle for continuously mixing and circulating said substances therethrough independently of the dispensing of material therefrom, a primary control for said dispensing means, and an automatic control for said dispensing means comprising a first element measuring the amount of material dispensed and a second element measuring time, said second element being operatively connected to said dispensing means and effective to cause the latter to dispense material after a predetermined time period has been measured thereby, said first element being operatively connected to said second element and effective to reset itself and said second element whenever it measures a predetermined amount of material dispensed from said receptacle.

28. A metered mixing system for mixing two substantially incompressible substances in predetermined proportions comprising two separate feed systems, one for each substance, each feed system comprising a reservoir, a measuring and dispensing unit connected thereto, and a common receptacle into which each unit empties, means active on each of said substances to force them from their reservoirs to said receptacle, said receptacle being closed and of fixed volume and having dispensing means associated therewith, means in said receptacle for continuously mixing and circulating said substances therethrough independently of the dispensing of material therefrom, a primary control for said dispensing means, and an automatic control for said dispensing means comprising a first element measuring the amount of material withdrawn and a second element measuring time, said second element being operatively connected to said dispensing means and effective to cause the latter to dispense material after a predetermined time period has been measured thereby, said first element being operatively connected to said second element and effective to reset itself and said second element whenever it measures a predetermined amount of material dispensed from said receptacle, and a third element actuated by said first element whenever the latter measures said predetermined amount of material dispensed and active on said second element to interrupt its time measurement for a short interval.

29. A metered mixing system for mixing two substantially incompressible substances in predetermined proportions comprising two separate feed systems, one for each substance, each feed system comprising a reservoir, a measuring and dispensing unit connected thereto, and a common receptacle into which each unit empties, means active on each of said substances to force them from their reservoirs to said receptacle, said receptacle being closed and of fixed volume and having dispensing means associated therewith, means in said receptacle for continuously mixing and circulating said substances therethrough independently of the dispensing of material therefrom, said dispensing means establishing a known rate of flow of material, a primary control for said dispensing means, and an automatic control for said dispensing means comprising first and second timers, said first timer measuring the time during which material is dispensed and said second timer measuring elapsed time, said second timer being operatively connected to said dispensing means and effective to cause the latter to dispense material after a predetermined elapsed time has been measured thereby, said first timer being operatively connected to said second timer and effective to reset itself and said second timer whenever it measures a predetermined period of time corresponding to a predetermined amount of material dispensed from said receptacle.

30. A metered mixing system for mixing two substantially incompressible substances in predetermined proportions comprising two separate feed systems, one for each substance, each feed system comprising a reservoir, a measuring and dispensing unit connected thereto, and a common receptacle into which each unit empties, means active on each of said substances to force them from their reservoirs to said receptacle, said receptacle being closed and of fixed volume and having dispensing means associated therewith, means in said receptacle for continuously mixing and circulating said substances therethrough independently of the dispensing of material therefrom, said dispensing means establishing a known rate of flow of material, a primary control for said dispensing means, and an automatic control for said dispensing means comprising first and second timers, said first timer measuring the time during which material is dispensed and said second timer measuring elapsed time, said second timer being operatively connected to said dispensing means and effective to cause the latter to dispense material after a predetermined elapsed time has been measured thereby, said first timer being operatively connected to said second timer and effective to reset itself and said second timer whenever it measures a predetermined period of time corresponding to a predetermined amount of material dispensed from said receptacle, and a third timer actuated by said first timer whenever the latter measures said predetermined period of time and active on said second timer to interrupt its timed measurement for a short interval.

References Cited in the file of this patent

UNITED STATES PATENTS

| | | |
|---|---|---|
| 583,786 | Bruum | June 1, 1897 |
| 808,599 | Crichfield | Dec. 26, 1905 |
| 1,225,978 | Ledoux | May 15, 1917 |
| 1,670,677 | Brown | May 22, 1928 |
| 1,727,353 | Merrick | Sept. 10, 1929 |
| 1,879,269 | Hutchison | Sept. 27, 1932 |
| 2,077,898 | Rolff | Apr. 20, 1937 |
| 2,203,980 | Burt | June 11, 1940 |
| 2,285,765 | Carswell | June 9, 1942 |
| 2,464,523 | Muench | Mar. 15, 1949 |
| 2,548,340 | Bower | Apr. 10, 1951 |
| 2,620,172 | Jenett et al. | Dec. 2, 1952 |
| 2,631,827 | Saxe | Mar. 17, 1953 |